Sept. 20, 1955     D. M. FINEFROCK     2,718,269

TRACTOR STEERING LEVER ARM ATTACHED BRAKE OPERATING LINKAGE

Filed Aug. 8, 1951     2 Sheets-Sheet 1

Delmar M. Finefrock
INVENTOR.

BY *Clarence A. O'Brien*
*and Harvey B. Jacobson*
Attorneys

Sept. 20, 1955     D. M. FINEFROCK     2,718,269
TRACTOR STEERING LEVER ARM ATTACHED BRAKE OPERATING LINKAGE
Filed Aug. 8, 1951     2 Sheets-Sheet 2

Delmar M. Finefrock
INVENTOR.

BY *Clarence A. O'Brien*
*and Harvey B. Jackson*
Attorneys

United States Patent Office 2,718,269
Patented Sept. 20, 1955

2,718,269

TRACTOR STEERING LEVER ARM ATTACHED BRAKE OPERATING LINKAGE

Delmar M. Finefrock, Canal Fulton, Ohio

Application August 8, 1951, Serial No. 240,832

2 Claims. (Cl. 180—6.32)

The present invention relates to new and useful improvements in combined brake and steering mechanism for tractors constructed and arranged whereby independently applied brakes for the rear wheels aid in the steering of the tractor.

An important object of the invention is to provide both foot and hand actuated steering means for the front wheels of the tractor and connecting the same to independent brakes for the rear wheels for applying the brake of one of the wheels to use both the braked wheel and the corresponding front wheel for steering.

Another object is to provide a brake attachment of this character which may be connected to the usual steering mechanism of well known tractors.

A further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
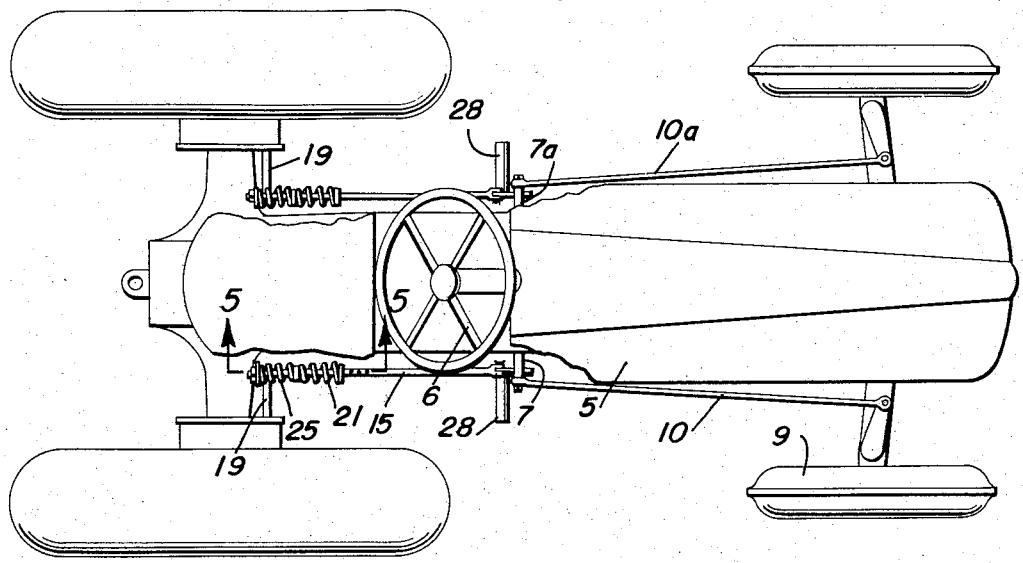
Figure 1 is a top plan view.
Figure 2:
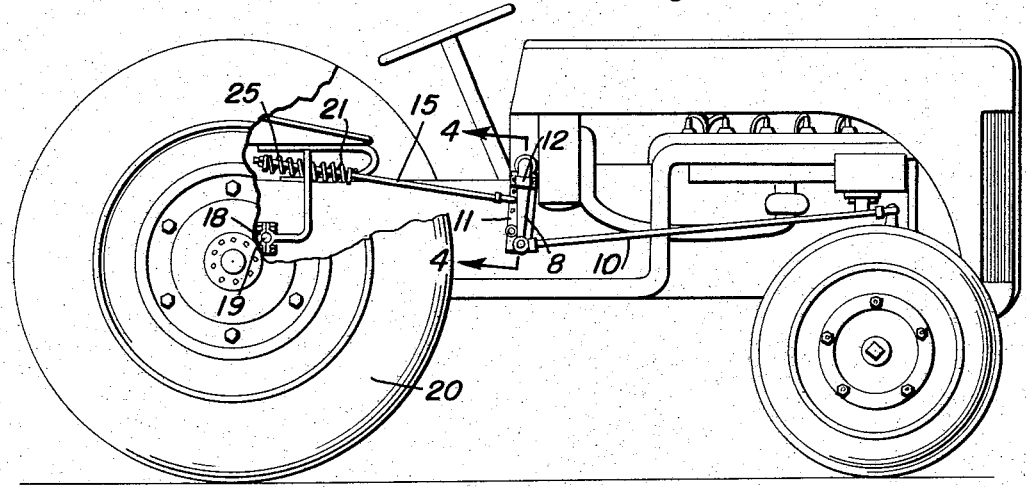
Figure 2 is a side elevational view.
Figure 3:
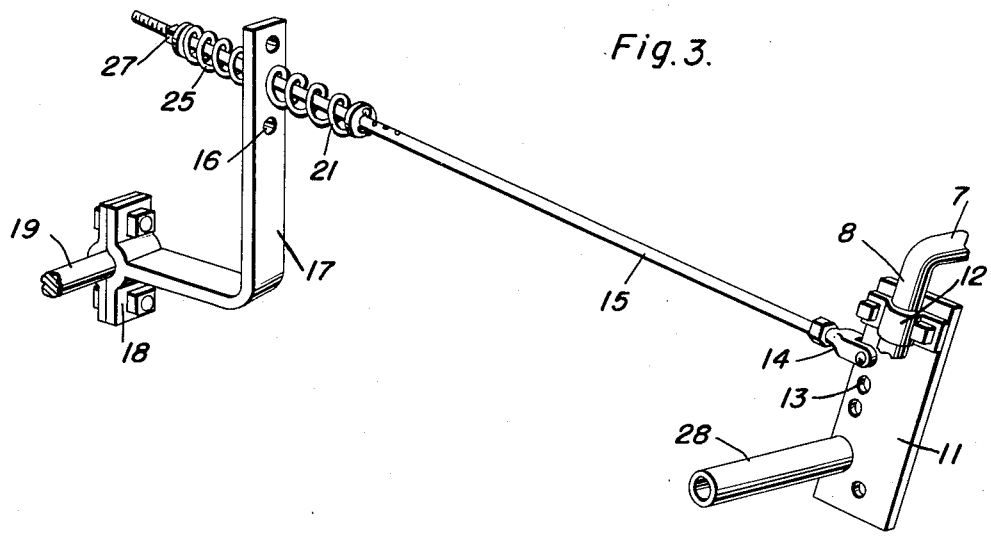
Figure 3 is an enlarged perspective view of one of the brake rod connecting means.
Figure 4:
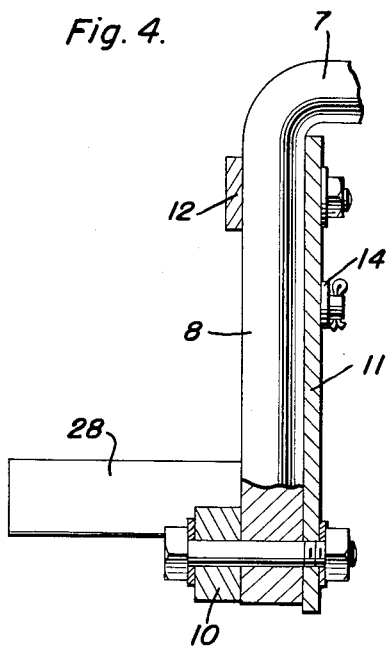
Figure 4 is an enlarged vertical sectional view taken on a line 4—4 of Figure 2 and Figure is an enlarged fragmentary sectional view of the adjustable front and rear brake springs taken on a line 5—5 of Figure 1.
Figure 5:
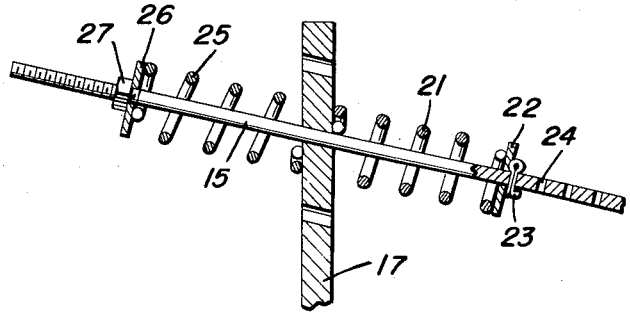

Referring now to the drawings in detail, wherein for the purpose of illustration I have disclosed a preferred embodiment of my invention, the numeral 5 designates a conventional type of farm tractor which is equipped with a steering wheel 6 operating right and left steering shafts 7 and 7a each having a crank arm 8 at its outer end and positioned at opposite sides of the tractor for connection with the adjacent front wheels 9 by steering rods 10 and 10a to pull one steering rod rearwardly and push the other steering rod forwardly to uniformly turn the front wheels either to the right or left and which structure is found in tractors now in use.

A plate 11 is secured in a vertical position to each crank arm 8 by clamps 12 and is formed at its rear edge with a vertical row of openings 13 in which a clevis 14 is selectively secured for vertical adjustment of a brake rod 15 connected at its front end thereto.

Brake rod 15 is slidable longitudinally in an opening 16 in the upper portion of an L-shaped bracket or lever 17 which is secured at its lower end by clamping plate 18 to the usual brake shaft 19 for the brake of the rear wheel 20 at the corresponding side of the tractor.

A front coil spring 21 is positioned on brake rod 15 and held under tension between bracket 17 and a washer 22 and cotter pin 23, the latter being selectively received in a group of openings 24 in the brake rod to adjust the tension of the spring, and a rear coil spring 25 is positioned on the brake rod and held under tension between bracket 17 and a washer 26 and nut 27 threaded on the rear end of the brake rod to adjust the tension of the rear spring.

A foot actuated bar or pedal 28 is secured to the lower portion of plate 11 is an outwardly projecting position.

In the operation of the device, as the front wheels are steered either to the right or left by either steering wheel 6 of foot pedals 28 the steering rod 10 of 10a at that side of the tractor will be pushed forwardly and the brake rod 15 at the corresponding side of the tractor will be pulled forwardly, or in a direction to apply the brake for the rear wheel at that side and which will thus further effect a steering movement in the desired direction.

The brake rod 15 at the opposite side of the tractor will be pushed rearwardly in a brake releasing movement which is taken up by front compensating coil spring 21 to prevent strain on the brake mechanism.

Rear coil spring 25 compensates for variation in the turning movement of the front wheels and brake applying movement of brake shaft 19 to avoid restricting a full steering movement of the wheels by the brakes.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. In combination, a front wheel steering and a rear wheel brake mechanism for tractors, said steering mechanism including a shaft having a forwardly and rearwardly swingable crank arm at each side of the tractor and a steering rod for each front wheel and said brake mechanism including a brake shaft and a brake rod operatively connected thereto, and means connecting the steering rod and brake rod to the crank arm at a corresponding side of the tractor for applying the brake in unison with the actuation of the steering rod upon a predetermined steering movement of the crank arm, said means comprising an elongated connecting member attached to the crank arm in parallel relation thereto and to the outer end portion of which the steering rod is attached, means selectively securing the brake rod in radially inwardly and outwardly adjusted positions adjacent the rear edge portion of said member to vary the brake applying movement of the brake rod relative to the steering movement of the steering rod, and a foot pedal carried by the connecting member for actuating the rods.

2. In combination, a front wheel steering mechanism for tractors including a forwardly and rearwardly swingable crank arm at each side of the tractor and a steering rod connecting each crank arm to an adjacent front wheel, and rear wheel brake applying means for each rear wheel of the tractor and comprising an elongated member, means securing said member in parallel relation to the arm, a brake rod connected at its rear end to the brake, and means connecting the front end of the brake rod to the elongated member in a selected adjusted position longitudinally of the latter to regulate the throw of the brake rod.

(References on following page)

References Cited in the file of this patent

UNITED STATES PATENTS

| | | |
|---|---|---|
| 1,134,235 | Sherman | Apr. 6, 1915 |
| 1,175,014 | Roger | Mar. 14, 1916 |
| 1,886,432 | Slocum | Nov. 8, 1932 |
| 1,998,677 | Laddon et al. | Apr. 23, 1935 |
| 2,261,398 | Milster | Nov. 4, 1941 |
| 2,336,891 | Schnell | Dec. 14, 1943 |

FOREIGN PATENTS

| | | |
|---|---|---|
| 353,376 | France | June 27, 1905 |
| 598,057 | France | Sept. 16, 1925 |
| 26,407 | Great Britain | 1906 |